F. L. DE LUCCHI.
CURRYCOMB.
APPLICATION FILED MAY 16, 1917.

1,240,124.

Patented Sept. 11, 1917.
2 SHEETS—SHEET 1.

WITNESSES
R E Rousseau
Rodney M. Smith

INVENTOR
F. L. De Lucchi,
BY Victor J. Evans,
ATTORNEY

F. L. DE LUCCHI.
CURRYCOMB.
APPLICATION FILED MAY 16, 1917.
1,240,124.
Patented Sept. 11, 1917.
2 SHEETS—SHEET 2.
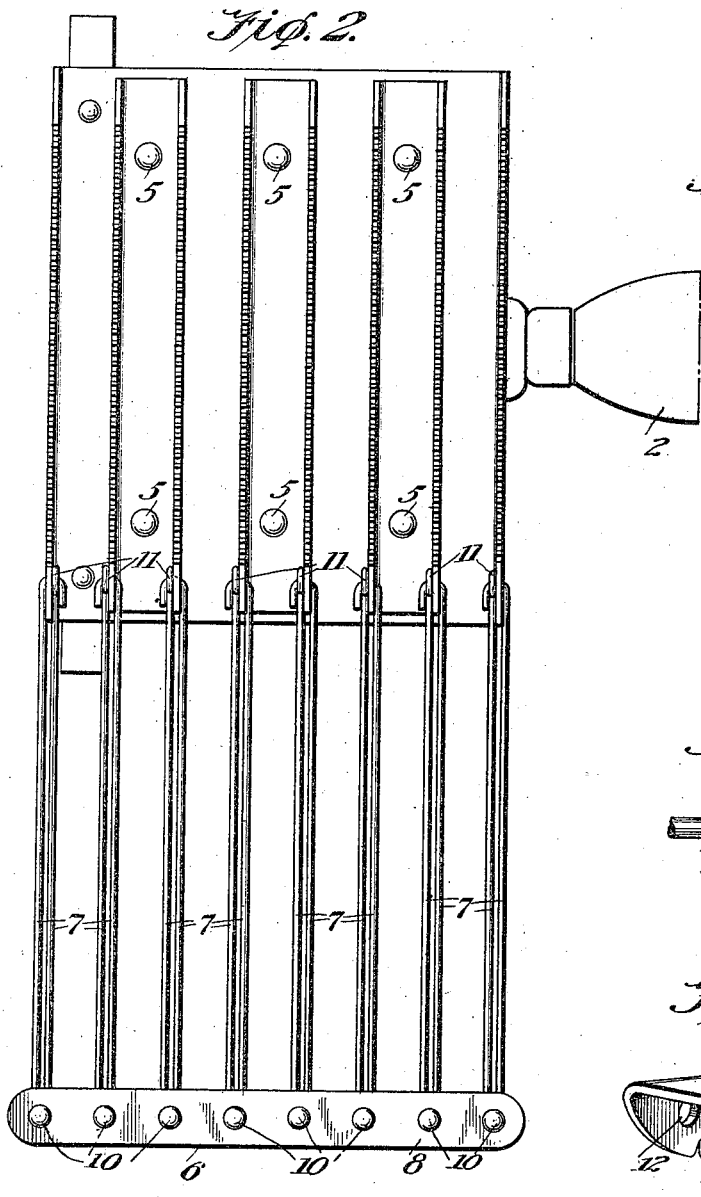
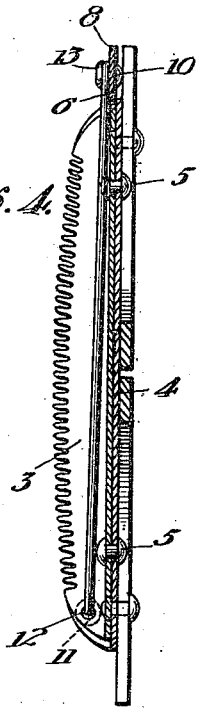
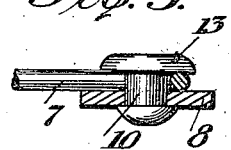
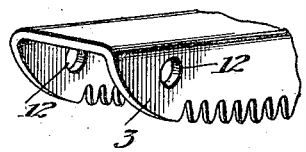
WITNESSES
INVENTOR
F. L. De Lucchi,
BY Victor J. Evans
ATTORNEY

UNITED STATES PATENT OFFICE.

FRANK L. DE LUCCHI, OF NOVATO, CALIFORNIA.

CURRYCOMB.

1,240,124.  Specification of Letters Patent.  Patented Sept. 11, 1917.

Application filed May 16, 1917. Serial No. 169,082.

*To all whom it may concern:*

Be it known that I, FRANK L. DE LUCCHI, a citizen of the United States, residing at Novato, in the county of Marin and State of California, have invented new and useful Improvements in Currycombs, of which the following is a specification.

This invention relates to curry combs and comprehends especially the provision of a curry comb having a cleaning attachment which on each operation will strip the blades of the comb of all accumulations.

Another object of the invention is to provide in a curry comb, a cleaning attachment comprising a plurality of wire loops secured at their outer ends to a swinging bar and at their inner ends to the comb blades, each loop being formed of a pair of parallel stripping bars, one of which is provided with an eye and the other of which is extended through the blade and hooks in said eye.

The invention also aims to provide an extremely simple and practical cleaning attachment for curry combs which will not injure an animal and which will prove a great time saver.

With these and other objects in view as will become more apparent as the description proceeds, the invention consists in certain novel features of construction, combination and arrangement of parts as will be hereinafter fully described, illustrated and claimed.

In the drawings,

Fig. 2 is a similar view with the cleaning attachment swung into inoperative position.

Fig. 4 is a transverse sectional view on the plane at right angles to the plane of Fig. 3.

Figs. 5 and 6 are detail views of parts to be hereinafter more fully described.

Figure 1:
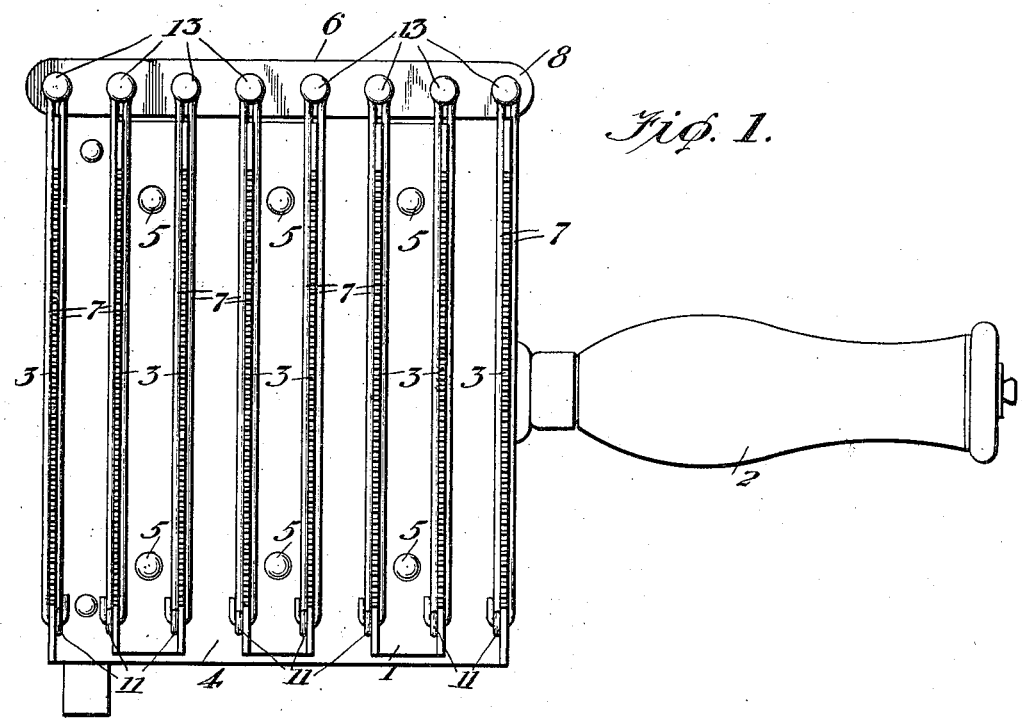
Figure 1 is a bottom plan view of the curry comb constructed in accordance with my invention.
Figure 3:
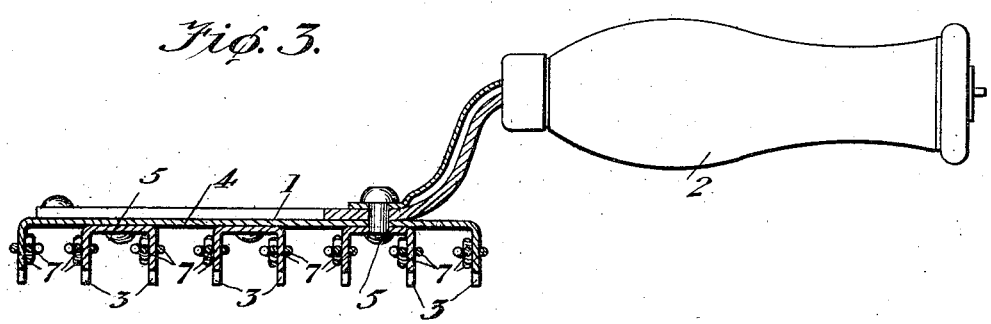
Fig. 3 is a central longitudinal sectional view through the curry comb with the parts arranged as shown in Fig. 1.

Referring in detail to the drawings by numerals, 1 designates the frame or body of a curry comb to which is attached the handle 2. A plurality of toothed blades 3 are secured to the body in parallelism with one another. The blades terminate short of the edges of the body and are preferably formed in pairs on an attaching strip 4 which is secured in position by rivets 5.

In carrying out my invention, I provide a cleaning attachment 6 which will simultaneously strip all of the blades of accumulations of hair, dirt and other extraneous matter. The attachment comprises a plurality of cleaning loops 7 which are connected to a bar 8. These loops are preferably formed of wire of suitable sized material and have their side bars 9 arranged so as to have a close contact with the sides of the blades. Each loop is formed of a single length of wire bent intermediate its ends about a rivet 10 and formed on one end with an eye 11. The other end of the loop is extended through an opening 12 in the blade, through the eye and then bent to form a hook so as to hold the side bars of the loop in close contact with the blade. Each rivet 10 is formed with a head 13 and the sides of the loops may be pinched inwardly toward each other adjacent the rivets. The bent ends of the side bars of the loops are preferably turned toward the bar 8 so as to lie against the corresponding side bar to better hold the latter in position for close engagement with this blade.

When the cleaning attachment is swung into closed position, the sides of the loops will frictionally engage the cleaning blades so as to hold the attachment in closed position at which time it will not interfere in any way with the usual handling of the curry comb. When it is desired to clean or strip the blades of their accumulations, it is only necessary to grasp the bar 8 and swing the cleaning attachment into open position which movement will cause the cleaning loops to free the blades of hair, dirt and other foreign matter.

From the foregoing description taken in connection with the accompanying drawings, it will be seen that I have provided an extremely simple and practical cleaner for curry combs which may be manufactured at a very low cost and which may be quickly secured to a commercial curry comb of ordinary construction.

While I have shown and described the preferred embodiments of my invention, it will be clearly understood that I do not wish to be limited to this construction, but may make such changes as will fall within the scope and spirit of the invention as claimed.

What I claim is:—

1. In combination with a curry comb having a plurality of comb blades, a cleaning attachment comprising a plurality of loops, a bar to which said loops are connected, each loop being formed of a continuous length of wire having an eye on one end and having its other end extended through one of the blades, and a hook in said eye whereby the loop is attached to the blade.

2. In a cleaning attachment for curry combs, a cleaning loop formed of a single length of wire bent intermediate its ends, the wire being formed with an eye in one end and a hook in the other end to engage in said eye, the hook end of the eye being extended through one of the comb blades.

3. In combination with a curry comb, having a plurality of comb blades, a cleaning attachment comprising a plurality of loops, a bar, rivets carried by said bar, each loop being formed of a single length of wire bent intermediate its ends about one of said rivets, one end of the wire being formed with an eye and the other end being provided with a hook, the hook end extending through one of the comb blades to engage said eye whereby the loop is secured to the blade.

In testimony whereof I affix my signature.

FRANK L. DE LUCCHI.

Copies of this patent may be obtained for five cents each, by addressing the "Commissioner of Patents, Washington, D. C."